United States Patent [19]

Eswaran et al.

[11] Patent Number: 5,711,904
[45] Date of Patent: Jan. 27, 1998

[54] CONTINUOUS MIXING OF SILICA LOADED ELASTOMERIC COMPOUNDS

[75] Inventors: Vetkav Rajagopalan Eswaran, Houston, Tex.; Christopher Kiehl, Akron, Ohio; Fredrick Lewis Magnus, Mogadore, Ohio; Pawan Kumar Handa, Akron, Ohio

[73] Assignee: The Goodyear Tire & Rubber Company, Akron, Ohio

[21] Appl. No.: 523,458

[22] Filed: Sep. 5, 1995

[51] Int. Cl.⁶ .............................. B29C 47/60; B29C 47/92
[52] U.S. Cl. ................................ 264/40.7; 264/211.23; 264/349; 425/145; 425/204
[58] Field of Search .................... 264/40.5, 40.7, 264/211.23, 211.24, 349; 425/145, 204, 208

[56] References Cited

U.S. PATENT DOCUMENTS

| | | | |
|---|---|---|---|
| 3,500,496 | 3/1970 | Perlberg et al. | 264/349 |
| 5,158,725 | 10/1992 | Handa et al. | 264/211.23 |
| 5,262,111 | 11/1993 | Capelle et al. | 264/211.23 |
| 5,336,730 | 8/1994 | Sandstrom et al. | 152/209 R |
| 5,374,387 | 12/1994 | Barnes et al. | 264/211.23 |
| 5,447,971 | 9/1995 | Bergh et al. | 152/209 R |

*Primary Examiner*—Mathieu D. Vargot
*Attorney, Agent, or Firm*—David E. Wheeler

[57] ABSTRACT

A method of making silica loaded elastomer masterbatches or compounded productive elastomer stocks with or without the simultaneous extrusion of component profiles is provided. A twin-screw extruder is used to mix the elastomeric stock in multiple mixing zones at controlled temperatures in which a concurrent chemical reaction takes place between the silica coupler, the silica, and/or the diene based elastomer. Silica, elastomer, silica coupler, and other ingredients are fed into the twin screw extruder continuously through precise loss-in-weight or volumetric feeders. Chemical reactions(s) in the elastomer/silica based composition take place within the twin-screw extruder while the composition is mixing. The product is forced through a profile die mounted at the exit of the extruder and formed into the shape of the desired component. The maximum rate of mixing tends to be a function of the heat transfer efficiency, the conveying capacity of the screws, and the mechanical strength of the extruder.

8 Claims, 7 Drawing Sheets

CONTINUOUS MIXING OF SILICA LOADED ELASTOMERIC COMPOUNDS

BACKGROUND OF THE INVENTION

The invention relates to a method for the manufacture of quantitatively silica loaded elastomeric compounds on a continuous basis. More particularly, the invention relates to the continuous manufacture or mixing of an elastomer/silica based composition with a concurrent chemical reaction taking place between a silica coupler, a silica and/or a diene based elastomer in which a twin-screw extruder is used as the mixing means.

In internal mixers, a rubber composition is mixed in batches with each batch being completed in one or more stages (commonly referred to as 'passes') through the mixer. The rubber composition is 'removed' or 'dumped' or 'batched-off' after each pass.

The mixing of rubbers with the fillers, plasticizers, and other ingredients, as well as the extension of the composition with oils, is usually accomplished in the first one or several 'non-productive' passes. Conventionally, in the non-productive mix stage(s), rubber, carbon black, silica, if silica is used, silica coupler, if such a coupler is used, and other rubber compounding ingredients, without curatives, are mixed together. The number of such 'non-productive' passes needed to accomplish the mixing is a function of the composition and the final properties that must be obtained in the mixture. Curatives, such as, sulfur, and additives that modify the cure rate, such as, accelerators, are usually added in a subsequent 'productive' pass through the internal mixer. Such step-wise batch mixing of rubber compositions is well known to those skilled in such art. In some instances, when the ingredients are more readily mixed, or a well dispersed mixture is not critical to the application, the entire mixing may be accomplished in one single 'unit-mix' pass.

Special considerations are necessary when silica is used in quantitative amounts, such as where the silica/carbon black ratio is at least 1:1 and particularly when a silica coupler is used. The quantitative amount of silica in a rubber mixture tends to be abrasive against the metal surfaces of the mixer. Further, in the event that a silica coupler is used, chemical reactions also take place which have to be taken into consideration, particularly when such chemical reactions become a dominant factor.

The extensive mixing requirements of silica reinforced rubber in a batch-type mixing operation is considered to be relatively expensive and inefficient.

Because of the low capacity of apparatus used for continuous mixing of rubber compositions, continuous mixing is not considered to be cost competitive with batch internal mixing, and is therefore not conventionally used in commercial practice where batch internal mixing is a reasonable alternative.

Continuous mixing may be cost effective, however, when mixing a quantitatively silica loaded rubber composition, where a silica coupler is used and corresponding chemical reactions take place during the mixing operation, and where a very homogeneous silica dispersion in the rubber composition is desired. In such a circumstance, where a more intensive and relatively expensive mixing is considered to be necessary and is juxtaposed with various aspects of control of the aforesaid chemical reactions taking place during the mixing operation, it is conceivable that a continuous extrusion mixing process would be competitive or even preferable to a series of batch mixing stages.

Pneumatic rubber tires are conventionally prepared with a rubber tread which can be a blend of various rubbers and which is typically reinforced with carbon black. Rubbers are evaluated, selected and blended for the purpose of achieving desired tire tread properties and particularly a balance of tire tread characteristic properties, mainly rolling resistance, traction, and wear.

For various applications utilizing rubber (including applications such as tires and particularly tire treads), sulfur cured rubber is utilized which contains substantial amounts of reinforcing filler(s). Carbon black is commonly used for such purpose and normally provides or enhances the physical properties of the rubber. Particulate silica is also sometimes used for such purpose, particularly when the silica is used in conjunction with a coupling agent. In some cases, a combination of silica and carbon black is utilized.

It is important to appreciate that, conventionally, carbon black is considered to be a more effective reinforcing filler for rubber tire treads than silica, if the silica is used without a coupling agent.

The rubber reactive group component of the coupler may be, for example, one or more of groups such as mercapto, amino, vinyl, epoxy, and sulfur groups, preferably a sulfur or mercapto moiety and most preferably sulfur.

Such coupling agents are generally composed of a silane which has a constituent component, or moiety, (the silane portion) capable of reacting with the silica surface, and, also a constituent component, or moiety, capable of reacting with the rubber, particularly a sulfur vulcanizable rubber, and thereby enhances the rubber reinforcement aspect of the silica.

The silanol group is believed to be the primary reactive group in silane coupling. Other functional groups may be present in silane couplers as exemplified in the following silane coupling agents: polysulfide silane, amino functionalized silane, and mercapto functionalized silane.

Examples of such silica couplers are mercaptopropyltrimethoxysilane sold under the trade name A189 by Union Carbide; and Bis-(3-(triethoxysilyl)-propyl)tetrasulfide/carbon black sold under the trade name X50S, Si69/Carbon black mixture by Degussa.

The silane of the coupling agent apparently forms a bond to the silica surface, possibly through hydrolysis, and the rubber reactive component of the coupling agent combines with the rubber. Usually the rubber reactive component of the coupler is temperature sensitive and tends to combine with the rubber during higher temperature mixing and/or the vulcanization stage, and thus, subsequent to the rubber/silica/coupler mixing stage and, therefore, after the silane group of the coupler has combined with the silica.

For example, Degussa explains the reinforcing action of its coupling agent, Si69, by noting that a chemical reaction occurs via the filler-reactive ethoxysilyl groups with the silanol groups on the silica surface, which form stable siloxane bonds. Also, chemical reactions between the tetrasulfane group and the elastomer during the vulcanizing process link the silica filler with the elastomer matrix. See also *Rubber Compounding*, F. W. Barlow, 2nd Ed, Marcel Dekker Inc., NY, 1993; Hewitt, N. L., Processing Technology of Silica Reinforced SBR, Elastomers, March 1981; Wolff, S., Effect of Bis-(3-(triethoxysilyl)-propyl) tetrasulfide Modified Silicas in NBR (Part 1), ACS Rubber Division, Washington, D.C., Sep. 1979; Bomal, Y., P. Cochet, and B. Dejean, ACS Rubber Division, Spring 1993 Denver Colorado, Paper 39; Bomal, Y., P. Cochet, B. Dejean, J. Machurat, and I. Gelling, ACS Rubber Division, Spring 1992, Paper 54; and Maisel, J. W., and W. E. Seeley, Rubb Plast News, 16(1), 26, 1986.

For silica reinforced tire treads, U.S. Pat. No. 5,066,721, in its Comparative Test Example 1 in Table 3 (column 15), discloses the use of a compound containing an SBR made by the solution polymerization process (hereinafter called s-SBR) containing 50 parts silica for a tire tread. Table 4 (column 17) illustrates the tire preparation. EPO application No. 501227-A also discusses the use of an s-SBR which is silica reinforced and in which the s-SBR is preferred over an SBR made by the emulsion polymerization process (hereinafter called e-SBR). U.S. Pat. No. 4,519,430 discloses a silica rich tire tread which contains solution or emulsion SBR, optionally with polybutadiene rubber and/or polyisoprene rubber together with a mixture of silica and carbon black, with silica being required to be a major component of the silica/carbon black reinforcing filler. U.S. Pat. No. 5,227,425 discloses a sulfur vulcanizable rubber composition for tire treads, composed of, for example, an s-SBR and a filler of which a majority portion is silica. EPO application No. 447,066 discloses a composition for a tire tread composed of silica and silane coupling agent with rubbers composed of polybutadiene or styrene/butadiene copolymer prepared with an organic alkali metal initiator and which may also contain other specified rubbers.

Other U.S. Patents relating to silicas and silica reinforced tire treads include U.S. Pat. Nos. 3,451,458; 3,664,403; 3,768,537; 3,884,285; 3,938,574; 4,482,663; 4,590,052; 5,089,554; and British 1,424,503.

Styrene-isoprene-butadiene terpolymer rubbers (hereinafter called SIBR) have been disclosed for use in tire treads. For example, U.S. Pat. No. 5,159,020 discloses such an SIBR and use thereof in a tire tread composition. It is disclosed therein that such tire tread can be composed of a blend of the SIBR and at least one other rubber such as natural rubber, polybutadiene rubber, 3,4-polyisoprene rubber and medium vinyl polybutadiene rubber. It is disclosed therein that the blend can contain silicas.

In one aspect, the mixing of rubber compositions on a continuous or single pass basis has previously been taught. For example, such a process has involved a machine which is essentially an internal mixer having a screw conveyor or an extruder located below the rotors of the mixer. See for example GB 2,173,441; GB 2,191,713; and GB 1,550,364.

The continuous mixing of elastomer compounds in a twin screw extruder is illustrated in U.S. Pat. No. 5,158,725 issued Oct. 27, 1992.

For a discussion of the slow adoption of continuous compounding in the rubber industry, see "A Tale of Continuous Development", European Rubber Journal, by Harry Ellwood, March 1987.

Somewhat related to the concept of continuous processing is Australian Patent Application AU-A-11177/93, which teaches a process using "one thermal step reaching a maximum temperature of between 130° C. and 180° C. for a suitable period of time which is a function of the temperature selected for the mechanical working and of the nature and volume of the components subjected to the said thermomechanical work and which is between 10 sec and 30 minutes, ..."

In conventional pneumatic tire tread manufacture, the tread profile extrusion is conducted in a hot or cold feed single-screw extruder. The tread compound is first mixed in an internal mixer in one or several stages as described above. This productive compound, after batch-off, is then guided into the feed box of a cold feed extruder at the end of which the desired tread profile die is mounted.

The single screw extruder pressurizes and forces the compound through the die and the desired tread contour is obtained. The extruded tread is then skived, that is, cut to the desired length, and conveyed to the tire building apparatus. Tread profile extrusion may alternatively be conducted using a hot-feed single-screw extruder. Both single-screw techniques are known to those skilled in the art.

It is one aspect of this invention to provide a means for combining the compound mixing step with the profile extrusion step in one single unit and thereby provide economy in tire tread manufacture by eliminating additional material handling that was needed to move, store, and feed the productive compound from the batch internal mixer to the single-screw extruder. Energy is also saved because the rubber compound does not have to be re-warmed to the extrusion temperature. In one embodiment, this invention discloses a means for mounting a tread profile die directly at the exit of a twin-screw extruder, which is used for mixing the compound.

A method for mixing and contemporaneously chemically reacting a silica loaded rubber compound which includes a silica coupler, in a continuous process, and a method for mixing and chemically reacting rubber with improved dispersion of the added ingredients is/are provided. In one embodiment the mixing and extrusion steps are combined into one continuous and contemporaneous manufacturing step.

SUMMARY OF THE INVENTION

The present invention relates to a method for the continuous mixing of elastomeric compositions comprising the steps of: a) providing a twin-screw extruder comprising a barrel housing containing the twin-screws, the barrel housing having associated therewith feed openings, and discharge and/or vent openings; b) determining feed rates based on the viscosity of the elastomer compound, the silica loading, the extent of reaction between the silica coupler, silica, and the diene rubbers, the size of the extruder, the mechanical strength and rotational speed of the screws; c) feeding an elastomer continuously in a controlled manner into the extruder through a feed opening; d) feeding the silica and/or other fillers and/or compounding ingredients through a feed opening or openings; e) mixing these ingredients as they are added to provide a mixture; f) controlling the temperature and pressure along the length of the extruder to enable the silica coupler to react with the silica and the rubbers; and g) pressurizing the compound and forcing it through a tread profile die or other contour die mounted at the exit of the extruder to obtain the desired extruded component suitable for building into tires.

Additional time may be provided for extended reaction between the silica coupler, the silica, and the rubber, or other interactions in the compound by the use of a string of one or more additional extruders. These may be separate independent entities or may be coupled to each other to form one continuous process. Such a string may comprise additional twin-screw extruders, single-screw extruders, calendars, or other continuous processing units such as Farrel continuous mixers. The various units that comprise such a string may be closely coupled to each other, such as, for example in a cross-head extruder mounting, or more loosely connected, such as, via festoons or belts that convey the material to the second unit. Such a 'loose-fitting' arrangement may be desirable in instances where additional cooling is needed as the material moves through the process.

DETAILED DESCRIPTION OF THE INVENTION

Figure 1:
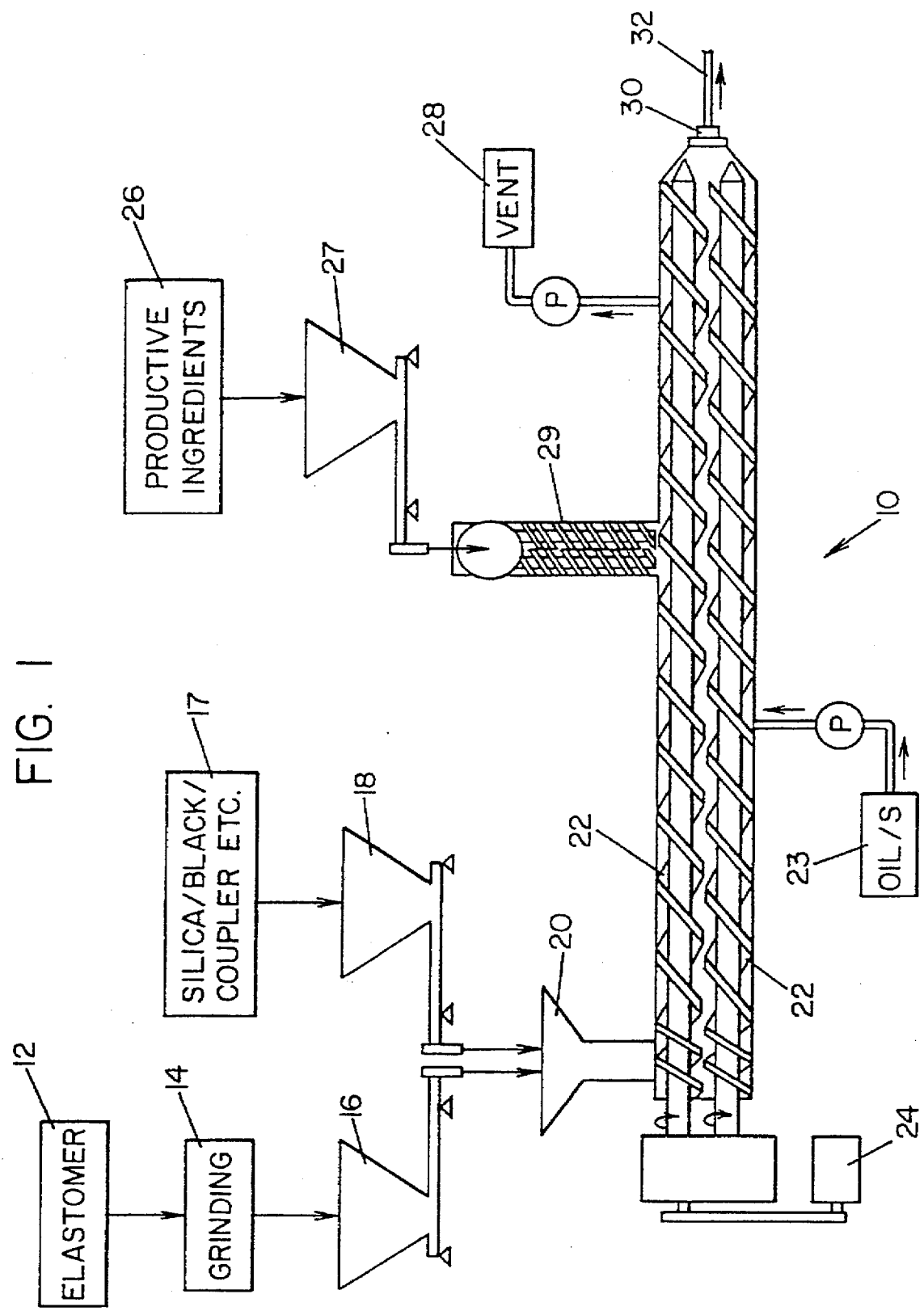
FIG. 1 illustrates a schematic diagram of the apparatus of the invention including a twin-screw extruder (TSE).

In accordance with this invention, a method is provided which comprises continuous mixing of an elastomer composition in a twin-screw extruder. The elastomer composition comprises, based on 100 parts by weight of rubber (phr), (i) at least one diene-rubber, (ii) about 30 to 110 phr silica, and (iii) at least one silica coupler having a moiety reactive with silicon dioxide and a moiety reactive with said rubber, in a weight ratio of silica to coupler of about 5/1 to about 15/1.

It is preferred that screw profiles used in the method of the invention have an L/D ratio of 5 to 70 preferably 15 to 45. Such screw profiles yield the desired level of dispersion without seriously degrading the polymer.

In a preferred embodiment, a twin-screw corotational extruder with a pair of parallel shafts that rotate at identical speeds is used. The center lines of the two shafts are so located as to provide intermeshing of the elements of the two shafts.

In the illustrated embodiment, the elements may be chosen such that 10% to 80% provide dispersive mixing, 10% to 80% provide distributive mixing, and 20% to 90% provide axial transportation.

Typical designs of each type of element have been illustrated in FIGS. 6–11 in the drawings. While it is not possible to completely isolate the conveying, distributive mixing, and dispersive mixing action of each type of element, the design of each element may be conveniently conceived of as being predominantly either conveying or distributive mixing or dispersive mixing.

Flow restrictors may be placed at 0 to 25 locations. The proportions of each type of element has been determined as a percentage of the total length of the extruder. The percentages may also be expressed for example as a number of individual pieces etc. The elements may further be arranged or interspersed on the screw shaft in a manner that would yield an optimal combination of transport, mixing, redistribution, axial mixing, and throttling.

Figure 6:
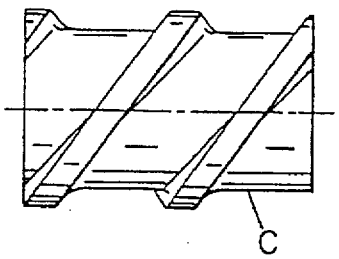
FIG. 6 illustrates a prior art conveying element (C) for a TSE.
Figure 7:
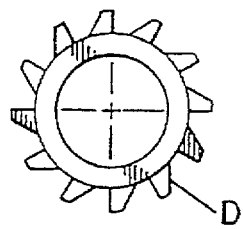
FIG. 7 illustrates a distributive mixing (G) element.
Figure 8:
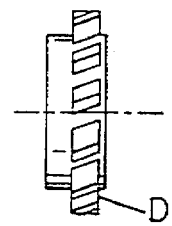
FIG. 8 illustrates a side view of a distributive mixing element.
Figure 9:
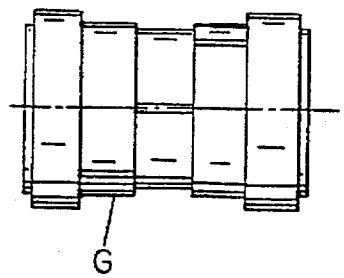
FIG. 9 illustrates a high shear dispersive (D) mixing element.
Figure 10:
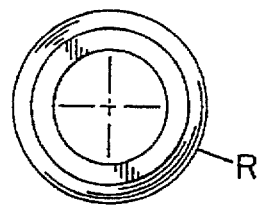
FIG. 10 illustrates a flow (R) restrictor.
Figure 11:
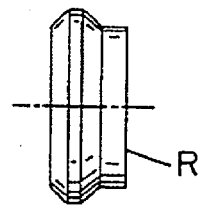
FIG. 11 illustrates a side view of the flow restrictor.

For convenience, as used herein, extruder elements will be identified with the following designations:
C represents a conveying element (FIG. 6)

D represents a dispersive mixing element (FIGS. 7–8)
G represents a distributive mixing element (FIG. 9)
R represents a flow restrictor (FIGS. 10–11)
S represents a spacer (not shown)

Referring now to FIG. 1, the elastomers and other ingredients may be added or metered into the extruder 10 at hopper 20 in a manner that provides adequate downstream mixing and at the same time reduces degradation of the elastomer or other components.

In turn, the elastomer may be premixed in hopper 20 with fillers, couplers and other ingredients 17 through feeder 18. It is preferred that elastomer 12 be preground in a grinding step 14 and retained in feeder 16 prior to its dispensing in hopper 20. The rate of rotation of screws 22 is controlled by motor 24.

In the illustrated embodiment, the elastomer is further broken up by the rotation of screws 22 and the elastomer is thoroughly mixed with the fillers and other ingredients 17. The mixing may be controlled to permit chemical reaction to take place during the mixing, such as reactions between couplers and rubber, and between couplers and filler such as silica and/or carbon black. Other additives, such as oil 23 can be added to the mix downstream of hopper 20.

In a one step process, the productive ingredients 26 can be added to the mix in the later stages of the mixing through feeder 27. The productive ingredients may be mixed prior to introduction into the barrel of twin-screw extruder 10 by feeding them into the barrel through a mixing device such as twin-screw extruder 29. Vent 28 releases gases created in the mixing process or by chemical reactions that take place during mixing.

The resulting productive elastomer mixture 32 may be discharged through a die 30 either directly or through a die arrangement. In the event that a die arrangement is used, its geometry as well as the size of the narrowest part of the construction must be controlled to regulate the head pressure, extrudate shape, and extrudate temperature. In an illustrated embodiment, the product may be expelled through one or more die openings having an area corresponding to 2 to 80% and preferably 10 to 50% of the nominal barrel cross-sectional area. The die openings may be of any shape dependent on the use contemplated for the extrudate, such as, for example, a tire tread or apex.

The rate of addition of elastomer, for example SBR, is carefully controlled by loss-in-weight feeders. The temperatures in the barrels is maintained at about 50° to 500° F., preferably 50° to 400° F. If desired, the rate of heating may be controlled by the use of electrical heating elements. Cooling is achieved by circulating water. The product is collected at the discharge end either directly as crumbs, or by extrusion through a die when a formed extrudate is desired.

Stabilizers and anti-oxidants such as trimethylquinolines, phenylenediamines, and phenothiazines and fillers such as silicon dioxide, carbon black, and zinc oxide, and their components such as sulfur, stearic acid, and other carboxylic acids, tetramethylthiuramdisulfide, and/or mercaptobenzothiazoledisulfide may be fed into the appropriate feed hopper.

The viscosity of the mixture may be adjusted by the injection of oils and waxes (typically petroleum based).

Examples of elastomer compounds that may be mixed in the method of the invention include natural rubber, polyisoprene, butyl and halobutyl rubber, polychloroprene, EPDM, styrene butadiene and polybutadiene rubbers, and mixtures thereof. Those skilled in the art will recognize similar rubbers known in the art, and chemical modifications thereof that can be used in the invention.

Various diene based rubbers can be used in the practice of the invention. For example, such rubbers can be selected from natural or synthetic 1,4-polyisoprene, cis 1,4-polybutadiene rubber, solution or emulsion polymerization prepared styrene-butadiene copolymer rubber, isoprene-butadiene copolymer rubber, 3,4-polyisoprene rubber, and styrene-isoprene-butadiene terpolymer rubber.

While, in one embodiment it is contemplated that the rubber can be natural (cis 1,4-polyisoprene) rubber, for many applications it is preferred that the rubber composition is composed of at least two rubbers.

The term "phr" as used herein, and according to conventional practice, refers to "parts by weight of the respective material per 100 parts by weight of the rubber constituent in the compound".

An s-SIBR terpolymer rubber is considered for use in one embodiment because s-SIBR provides a good balance of wet skid and rolling resistance for a rubber composition to be used for a tire tread. This means that improvements in a tire tread's wet skid resistance and in its rolling resistance may be more readily obtainable with the utilization of the said s-SIBR terpolymer than with an s-SBR rubber.

Styrene-isoprene-butadiene terpolymer rubber (SIBR) is prepared by solution polymerization. A s-SIBR terpolymer rubber is disclosed, for example, in U.S. Pat. No. 5,159,020 which is incorporated herein by reference.

Rubber for the tire tread may also contain carbon black and silica at a weight ratio of silica to carbon black of 1.5/1 to 15/1, optionally of 4/1 to 15/1, and for some applications 10/1 to 15/1.

Siliceous pigments commonly employed in rubber compounding applications can be used as the silica in this invention, including pyrogenic and precipitated silicas, although precipitated silicas such as, for example, those obtained by the acidification of a soluble silicate, e.g., sodium silicate, are preferred.

The BET surface area of the silica pigment, as measured using nitrogen gas, is preferably in the range of about 100 to about 250, preferably about 120 to 180, square meters per gram. The BET method of measuring surface area is described in the *Journal of the American Chemical Society*, Volume 60, page 304 (1930).

The silica also typically has a dibutylphthalate (DBP) absorption value of about 200 to about 400, and usually about 250 to about 300 milliliters per hundred grams.

The silica might be expected to have an average ultimate particle size, for example, in a range of 5 to 10 nanometers as determined by the electron microscope, although the silica particles may be even smaller in size, and it is believed that silica particles of 2 to about 15 nanometers can be used in the invention.

Various commercially available silicas may be considered for use in this invention such as, for example, silicas commercially available from PPG industries under the Hi-Sil trademark such as those with designations 210, 243, etc. The Rhone-Poulenc Z1165MP silica is a preferred silica which is reportedly characterized by having a BET surface area of about 160–170 square meters per gram and by a DBP value of about 250–290 milliliters per 100 grams and by having a substantially spherical shape.

Typical amounts of tackifier resins, if used, comprise about 0 to 10 phr, usually about 1 to about 5 phr. Typical amounts of processing aids comprise about 1 to about 50 phr. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others, such as, for example, those disclosed in the *Vanderbilt Rubber Handbook* (1978), pages 34–346. Typical amounts of antiozonants comprise about 1 to about 50 phr.

Typical amounts of zinc oxide comprise about 2 to about 5 phr. Often microcrystalline waxes are used. Typical amounts of peptizers comprise about 0.1 to about 1 phr. Typical peptizers may be, for example, pentachlorothiophenol and dibenzamidophenyl disulfide.

Vulcanization of the elastomer is preferably conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in the amount ranging from about 0.5 to about 4 phr, and in some circumstances, up to about 8 phr, with a range of from about 1.5 to about 2.5, and sometimes from 2 to 2.5 being preferred.

Although the mechanisms are not understood, it appears that a rubber compound gains its strength and other physical properties from the proper distribution of ingredients in the final mixture and the reactions between the ingredients.

It is especially advantageous to have some of these reactions proceed at an early stage during the mixing process. Other reactions such as the curing reactions need to be completed after the desired profile of the component has been shaped. Yet other ingredients such as antiozonants and antioxidants protect the final product from degradation by participating in reactions that occur after the curing stage. The rubber compound is extremely complex and all these reactions for the most part are not fully understood.

The method includes one or more of the following steps:
1. Reducing the elastomers to a form that can be metered continuously to the TSE. This can be done either by grinding/shredding and/or by plasticating using another extruder or mills etc. The elastomers would then be fed to the extruder either directly using volumetric or weight feeders or using strip feeders, gear pumps etc.
2. Feeding these elastomers to the feed openings provided on the twin-screw extruder.
3. Feeding one or more of the fillers and/or other ingredients through feed openings along the length of the extruder.
4. Achieving the mixing of these ingredients and reactions between them by using a properly designed set of screw elements that would yield the necessary interaction between the species.

The process may be conducted in one pass or may be split into multiple passes as follows:
1. Mixing some or all of the non-productive ingredients in one or more passes through a TSE.
2. Mixing the remaining non-productive ingredients in subsequent passes as necessary.
3. Mixing the curatives, accelerators and some of the other ingredients in productive passes through a TSE.

The intermediate elastomeric products from these passes may be ground or sheeted and fed to the next pass. Interstage cooling may be accomplished when necessary by quenching with water or by cooling in a stream of air. The water quenched product may be dried prior to being fed into the next stage.

It may also be advantageous to conduct one or more of the passes of the mixing in a conventional manner through an internal batch mixer.

The entire process may be conducted in a continuous manner or in a semi-batch manner depending on the characteristics of compound that is to be mixed.

In conventional mixing processes in batch mixers, the properties of silica reinforced rubber compounds, depend on the number of times the rubber compound is mixed in the batch mixer. Generally, desirable properties are not obtained in compounds that go through one, two or three passes in the mixer, but five or six passes in the mixer improves the properties of a compound for certain uses. The amount of mixing that a compound goes through is generally referred to in the art as mixing "equivalents", it now being generally accepted that a compound is defined as much by its mixing equivalents as it is by its ingredients. "Equivalents" are sometimes defined in terms of the amount of power consumed by the mixer, in kilowatts for example, during the mixing process.

In the practice of the present invention, it has been theorized that the process of mixing elastomer compounds in a twin screw extruder imparts to a compound a large proportional amount of mixing equivalents, in relation to its reduced residence time in the twin screw extruder, and the reduced power consumption of the extruder. This theory is premised on the improved properties of the compounds obtained when mixed in the twin screw extruder.

Figure 2:
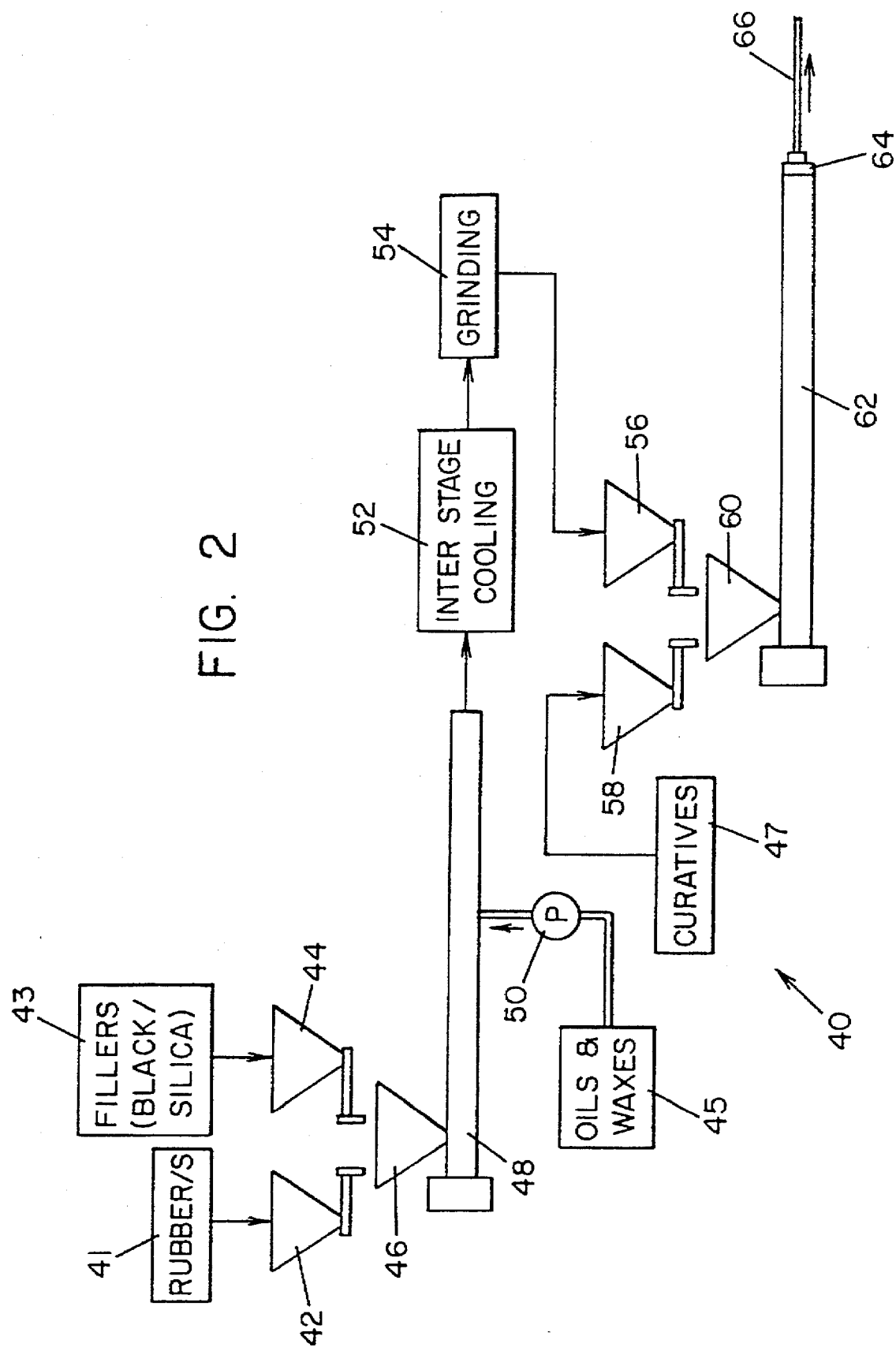
FIG. 2 illustrates an alternative embodiment of the continuous mixing process.
Figure 3:
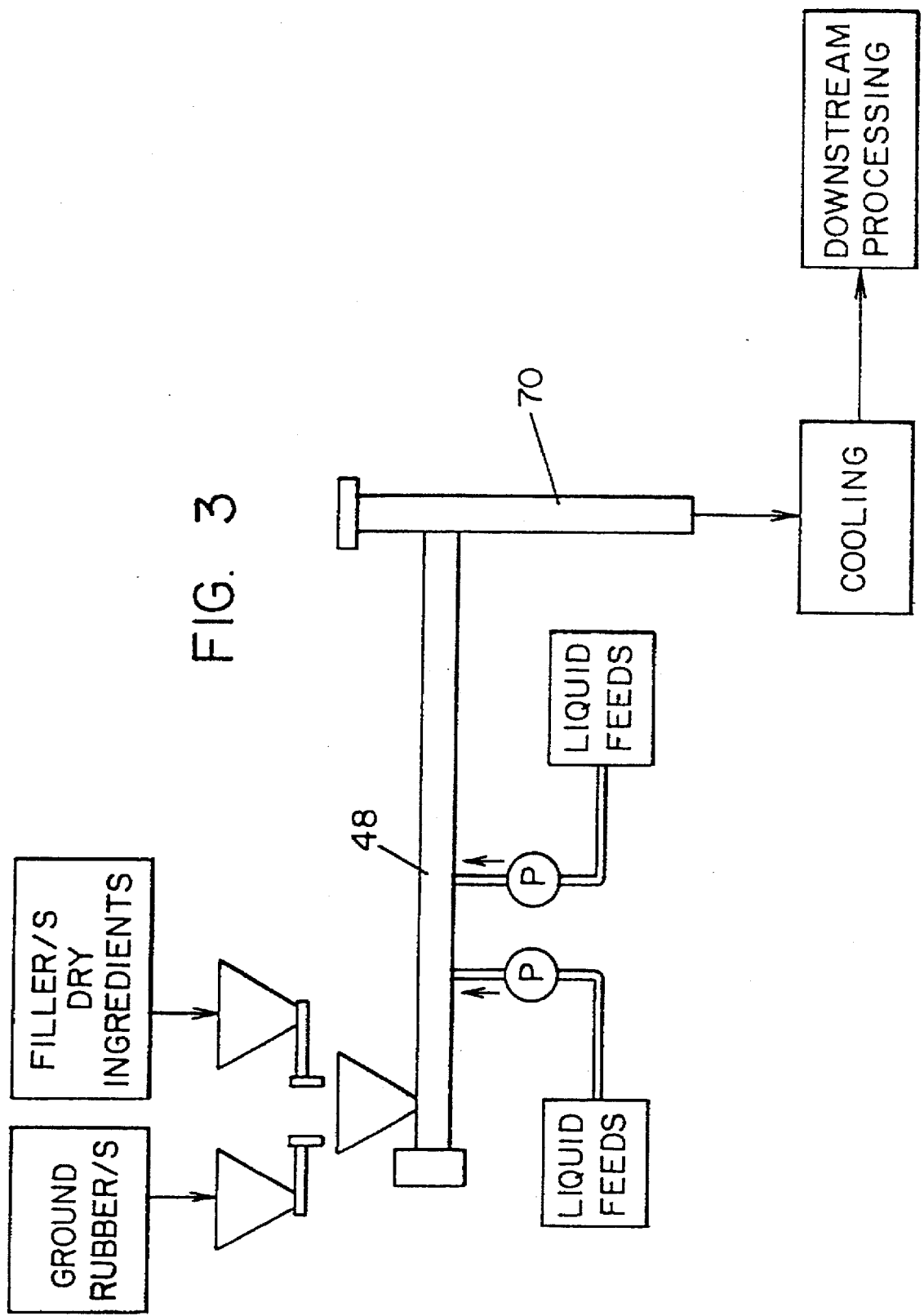
FIG. 3 illustrates an alternative embodiment of the continuous mixing process.

FIGS. 2–3 illustrate some alternative arrangements for the apparatus which may be adapted for different types of elastomer products.

FIG. 2 illustrates an embodiment where rubber 41 is dumped into feeder 42 and fillers 43 are dumped into feeder 44 and together are fed into hopper 46 for introduction into twin screw extruder 48. The viscosity of the rubber mixture may be controlled somewhat by the introduction of oils and waxes 45 through pump 50. In this embodiment the rubber is subjected to interstage cooling 52, and is ground 54 before being dumped into feeder 56. Curatives 47 are added to feeder 58, and together with the ground rubber are introduced into hopper 60 for introduction into twin screw extruder 62 to provide production mix 40. The productive elastomer 66 may be extruded through die 64.

FIG. 3 illustrates an alternative arrangement, the use of which will be apparent to those skilled in the art with reference to the foregoing discussion. FIG. 3 illustrates a means whereby the number of mixing equivalents of the mixture can be increased by feeding the extrudate from twin screw extruder 48 directly into a second single screw or twin screw extruder 70 to increase the residence time of the rubber mixture.

Figure 4:
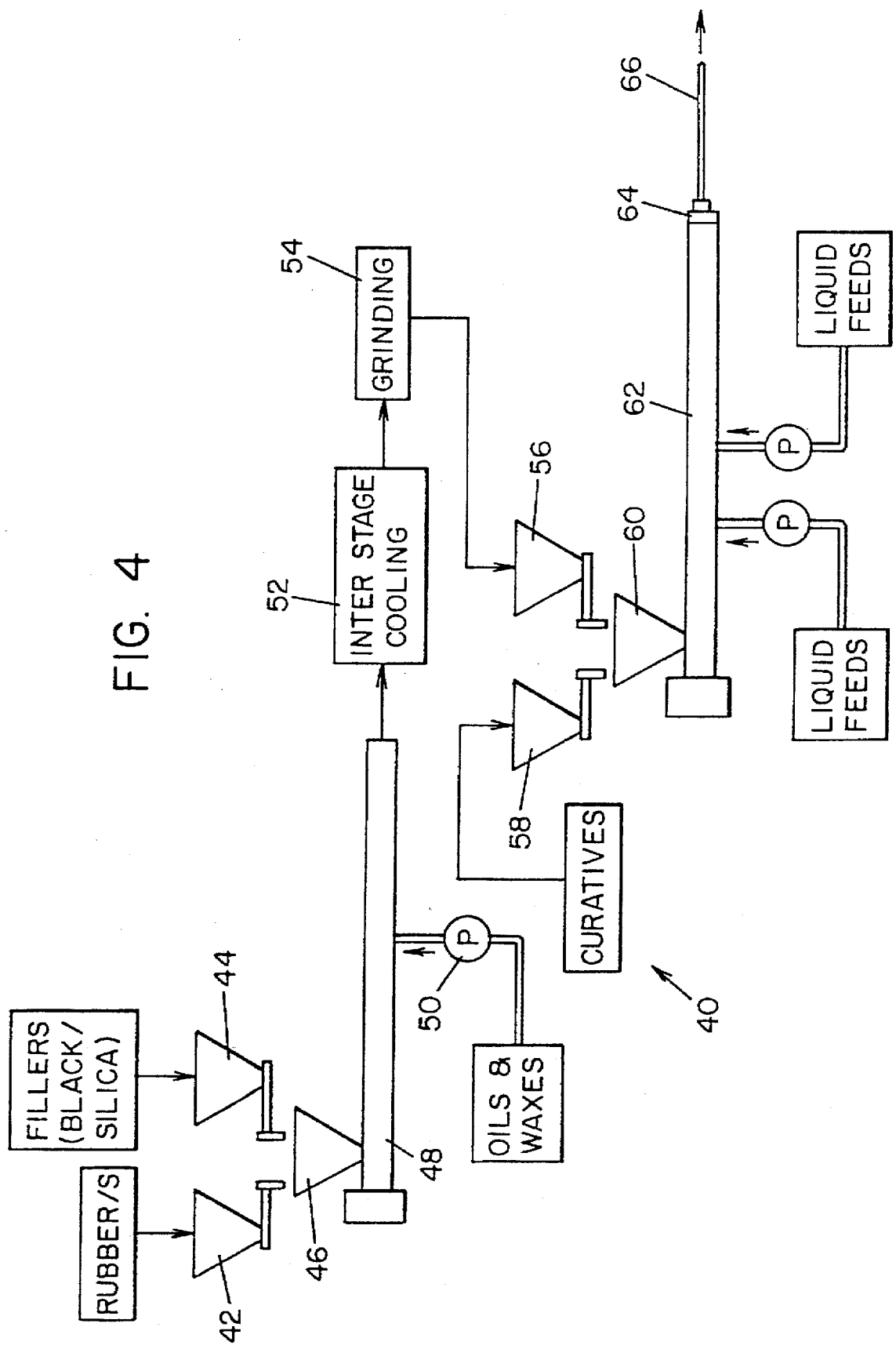
FIG. 4 illustrates an alternative embodiment of the continuous mixing process, used in example 2.

FIG. 4 illustrates an embodiment, as illustrated in example 2, wherein the rubber mixture, including the curatives, is subjected to interstage cooling, before being further mixed in second twin screw extruder 72, optionally with added ingredients.

Figure 5:
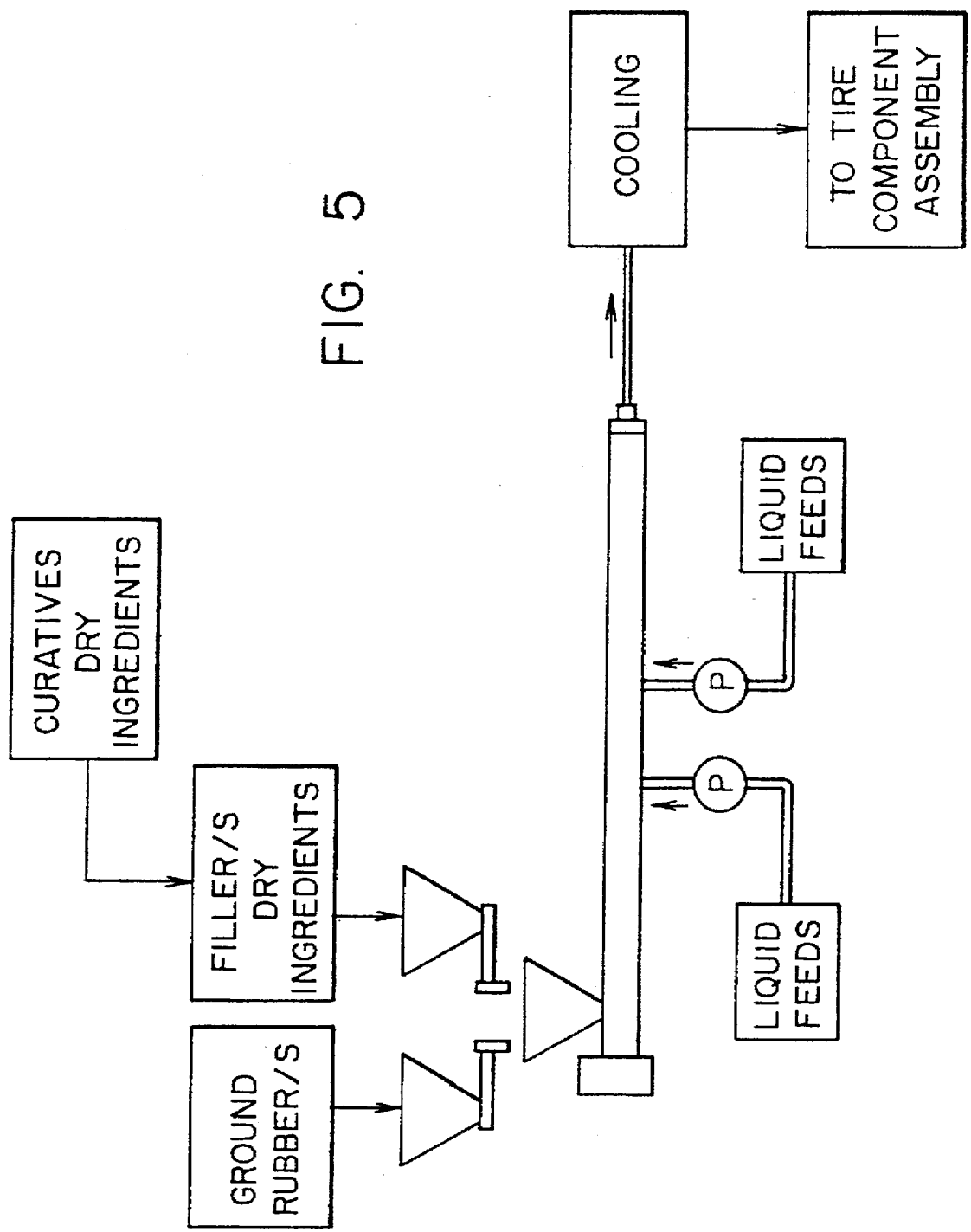
FIG. 5 illustrates an alternative embodiment of the continuous mixing process, used in example 1.

FIG. 5 illustrates a schematic similar to FIG. 1 where cooling and component steps are illustrated, as illustrated in example 1.

Some of the illustrated set-ups may be recognizable with reference to the following examples. The invention may be better understood by reference to the examples in which the parts and percentages are by weight unless otherwise indicated.

EXAMPLE 1

This example illustrates the use of a twin screw extruder for the continuous mixing of a silica loaded compound. The process was carried out using a corotating, intermeshing, twin screw extruder having a barrel diameter of 90 mm, as illustrated in FIG. 5. The temperatures in the barrel sections were controlled by electrical heating elements mounted on the barrels and by a stream of cooling water circulated through bores provided through the barrels. The design of the extruder screw elements was as follows where:

C represents a conveying element
D represents a dispersive mixing element
G represents a distributive mixing element
R represents a flow restrictor
S represents a spacer
f indicates a design that provides forward pumping
r indicates a design that provides reverse pumping
n indicates a design that provides negligible pumping and where the number of cams in each unit, the width of each cam, and the angle of stagger in degrees between them is indicated. For example, D (5×12 mm×45°) means a dispersive mixing unit comprising 5 cams, each 12 mm wide and staggered at an angle of 45°. A screw cap nut is used to hold all the various elements together on the shaft.

SCREW DESIGN FOR EXAMPLE 1

| NO. | ELEMENT | DIRECTION OF PUMPING | NO. OF FLIGHTS | PITCH | LENGTH ELEMENT (mm)/TOTAL SCREW LENGTH (mm) |
| --- | --- | --- | --- | --- | --- |
| 1 | C | f | 1 | 40 | 40/40 |
| 4 | C | f | 2 | 120 | 120/520 |
| 1 | D (5 × 12 mm × 45°) | f | 2 | | 60/580 |
| 1 | D (5 × 12 mm × 45°) | r | 2 | | 60/640 |
| 3 | C | f | 1 | 120 | 120/1000 |
| 1 | C | f | 2 | 60 | 60/1060 |
| 2 | G | f | | | 20/1100 |
| 1 | C | f | 2 | 120 | 120/1220 |
| 1 | C | f | 2 | 80 | 80/1300 |
| 2 | G | f | | | 20/1340 |
| 3 | C | f | 2 | | 120/1700 |
| 1 | D (5 × 12 mm × 45°) | f | 2 | | 60/1760 |
| 1 | D (5 × 8 mm × 45°) | r | 2 | | 40/1800 |
| 2 | C | f | 2 | 120 | 120/2040 |
| 1 | S | n | | | 10/2050 |
| 3 | C | f | 2 | 120 | 120/2410 |
| 2 | C | f | 2 | 80 | 80/2570 |
| 1 | Screw Cap Nut | — | — | — | — |

The compound used in this example is illustrated by the following formula:

EXAMPLE 1 Formulation

| Ingredients | Parts | |
|---|---|---|
| Styrene, Isoprene Butadiene Terpolymer | 70.0 | SIBR |
| Polybutadiene | 30.0 | PBD |
| Silica | 10.0 | HiSil 233 (PPG) |
| Silica | 67.0 | HiSil210 (PPG) |
| Coupling agent (silane/carbon black) | 12.8 | Bis-(3-(triethoxysilyl)-propyl) tetrasulfide |
| Aromatic oil | 26.25 | Sundex 8125 |
| Petroleum wax | 1.0 | Shell wax 400 |
| Petroleum wax | 0.5 | Shell wax 230 |
| Oleic acid | 3.0 | Emersol 210 |
| Antioxidant | 2.0 | phenylene diamine |
| Accelerator | 0.15 | N-(cyclohexylthio) phthalimide |
| Zinc oxide | 2.5 | |
| Sulfur diphenyl | 1.4 | |
| Diphenyl guanidine | 2.0 | N,N-diphenyl guanidine |
| Sulfenamide | 1.2 | N-cyclohexyl -2-benzothiazole sulfenamide |
| Silica | 3.0 | Zeosil Micropearl |
| | | (Rhone Poulenc) |
| Total parts | 232.8 | |

A 70:30 blend of an s-SIBR and a cis 1,4-polybutadiene rubber was first granulated to an average particle size of about ⅜ inch and dusted with a light coating of silica to prevent reagglomeration. This granulated rubber was fed through the feed opening of the twin-screw extruder using a gravimetric feeder. Other dry ingredients including silicas, coupling agents and curatives, were mixed together and gravimetrically fed into the feed hopper of the extruder. Such a pre-blend is advantageous in eliminating the need for several expensive gravimetric feeders. However, care should be exercised in preparing such pre-blends in order to avoid any inadvertent or deleterious premature chemical or physical interaction between the various ingredients. The silica used had a BET surface area of about 150 square meters/gram. The silica coupler was a 50:50 mixture of a silane and carbon black. Oils, waxes and antioxidants were injected continuously into the extruder downstream of the feed hopper. The addition of such liquids at temperatures lower than that of the composition within the extruder provides additional cooling to the mixture.

Figure 13:
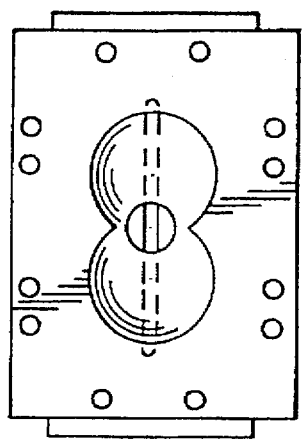
FIG. 13 illustrates the profile die used in the TSE in Example 1.

A specially designed tread contour profile die was mounted at the exit of the twin-screw extruder and the mixture was formed into the desired shape as it left the extruder. The die had a cross sectional area of about 2.1 square inches. The die used in this example is illustrated in FIG. 13.

A production rate of 225 lb/hr was achieved with the 90 mm twin-screw extruder when operated at 49 rpm. The resulting power consumption was 90 kilowatts. The six extruder barrel zones and the die were maintained at 61°, 175°, 126°, 103°, 107°, and 195° F. The material exited the extruder at 260° F.

In the following table, the physical properties of the compound, Example 1–90, prepared in the manner described above, are compared to those of a similar compound made using the same ingredients, Control 1-BB, mixed in the conventional manner, in a Banbury® type internal mixer. The properties of the compound made using the process described in this invention were superior to those of the compound produced using the conventional process.

In the table, Rebound relates to rolling resistance with the higher value being better, DIN abrasion relates to tread wear with the lower number being better, and tensile modulus is measured with the objective of maximizing the ratio of the 300% to 100% modulus in order to maintain a balance between tread wear and rolling resistance (Australian Patent App. AU-A-11177/93).

TABLE 1

| | Example 1–90 | Control 1-BB |
|---|---|---|
| Silica BET (m**2/g) | 150 | 150 |
| Rebound, RT (%) | 36.3 | 33.7 |
| Rebound, 100C (%) | 62.8 | 57.6 |
| DIN Abrasion | 140 | 122 |
| Tan Delta (11 Hz, 0C) | 0.212 | 0.153 |
| 300%/100% Modulus Ratio | 3.18 | 2.73 |

EXAMPLE 2

The second example illustrates the use of a twin screw extruder for the continuous mixing of a silica loaded non-productive compound. The compound used in this example is illustrated in the formula below.

The set up of a proposed apparatus using cascading twin screw extruders is illustrated in FIG. 2. An understanding of FIG. 2 can be obtained with reference to the description in the specification.

The compound illustrated in this example was mixed with curatives in a conventional Banbury mixer.

In the case of the 90 mm extruder a production rate of 600 lb/h was achieved at an extruder speed of 85 rpm. The power consumption of 95 kilowatts. The temperature of the extrudate was 300° F. The material was extruded through a slit die with a cross sectional area of about 2.8 square inches. The design of the screw elements is described below.

| Ingredients | Parts | |
|---|---|---|
| Twin-screw extruder pass | | |
| Styrene, Isoprene Butadiene Terpolymer | 70.0 | SIBR |
| Polybutadiene | 30.0 | PBD |
| Silica | 10.0 | HiSil233 (PPG) |
| Silica | 67.0 | HiSil 210 (PPG) |
| Coupling agent (silane/carbon black) | 12.8 | Bis-(3-(triethoxysilyl-propyl) tetrasulfide |
| Aromatic oil | 26.25 | Sundex 8125 |
| Petroleum wax | 1.0 | Shell wax 400 |
| Petroleum wax | 0.5 | Shell wax 230 |
| Oleic acid | 3.0 | Emersol 210 |
| Antioxidant | 2.0 | phenylene diamine |
| Total Parts | 222.55 | |
| Banbury pass | | |
| TSE pass material | 222.55 | |
| Accelerator | 0.15 | N-(cyclohexylthio) phthalimide |
| Zinc oxide | 2.5 | |
| Sulfur | 1.4 | |
| Diphenyl guanidine | 2.0 | N,N-diphenyl guanidine |
| Sulfenamide | 1.2 | N-cyclohexyl -2-benzothiazole sulfenamide |
| Silica | 3.0 | Zeosil Micropearl |
| | | (Rhone Poulenc) |
| Total Parts | 232.8 | |

| SCREW DESIGN FOR EXAMPLES 2, 3 and 4 | | | | | |
|---|---|---|---|---|---|
| NO. | ELEMENT | DIRECTION OF PUMPING | NO. OF FLIGHTS | PITCH | LENGTH ELEMENT (mm)/TOTAL SCREW LENGTH (mm) |
| 1 | C | f | 1 | 40 | 40/40 |
| 3 | C | f | 2 | 120 | 120/400 |
| 1 | C | f | 1 | 80 | 80/480 |
| 2 | D (5 × 12 mm × 45°) | f | 2 | | 60/600 |
| 1 | C | f | 1 | 80 | 80/680 |
| 1 | D (5 × 12 mm × 45°) | r | 2 | | 60/740 |
| 2 | C | f | 2 | 120 | 120/980 |
| 1 | C | f | 1 | 80 | 80/1060 |
| 2 | G | f | | | 20/1100 |
| 3 | C | f | 2 | 120 | 120/1460 |
| 2 | G | f | | | 20/1500 |
| 2 | C | f | 2 | 120 | 120/1740 |
| 2 | G | f | | | 20/1780 |
| 1 | C | f | 2 | 120 | 120/1900 |
| 1 | D (5 × 12 mm × 45°) | r | 2 | | 60/1960 |
| 1 | S | n | | | 10/1970 |
| 5 | C | f | 2 | 120 | 120/2570 |
| 1 | Screw Cap Nut | — | — | — | — |

Figure 12:
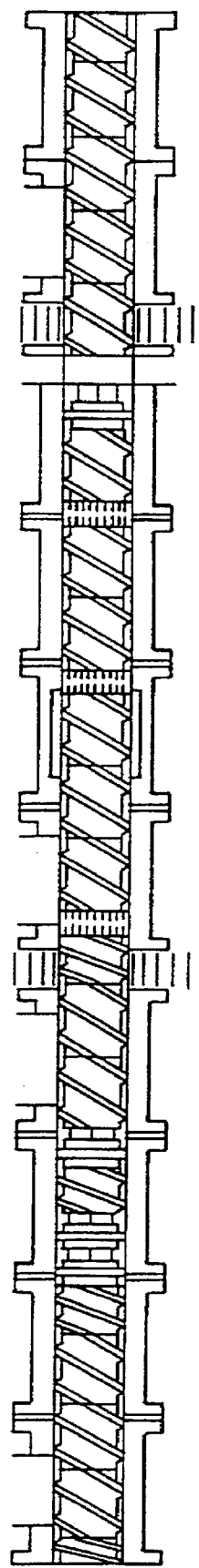
FIG. 12 illustrates the screw profile used in the TSE in Examples 2, 3 and 4.

A portion of the screw profile for this example is illustrated in FIG. 12.

The twin screw extruder mixed nonproductive compound was then mixed with curatives and accelerators in the conventional manner in a Banbury type batch mixer. In Table 2 the properties of the cured sample made from the twin screw extruder non-productive is compared to the productive sample mixed in one pass through the twin screw extruder (1–90) as described in Example 1. The compound made from the twin screw extruded non-productive is designated Example 2–90. It can be seen that mixing the productive compound and extruding the tread in one pass through the twin-screw extruder provides superior properties. This process is also more economical.

TABLE 2

| | Example 2-90 | Example 1-90 |
|---|---|---|
| Silica BET (m**2/g) | 150 | 150 |
| Rebound, RT (%) | 29.1 | 36.3 |
| Rebound, 100C (%) | 58.2 | 62.8 |
| DIN Abrasion | 141 | 140 |
| Tan Delta (11 Hz, 0C) | 0.192 | 0.212 |
| 300%/100% Modulus Ratio | 3.26 | 3.18 |

EXAMPLE 3

This example shows the effect of two different types of silica, mixed using the process described in example 2, on the properties of tread compound. The compound used in the example is illustrated by the following formula.

Table 3 compares the properties obtained. It can be seen that the silica with the higher surface area and predominantly spherical morphology provides a compound with superior properties.

| Twin-screw extruder pass | | |
|---|---|---|
| Ingredients | Parts | |
| Styrene, Isoprene Butadiene Terpolymer | 70.0 | SIBR |
| Polybutadiene | 30.0 | PBD |
| Silica | 10.0 | HiSil 233 (PPG) |
| Silica | 67.0 | Zeosil Micropearl (Rhone Poulenc) |
| Coupling agent | 12.8 | Bis-(3-(triethoxysilyl)-propyl) tetrasulfide |
| Aromatic oil | 26.25 | Sundex 8125 |
| Petroleum wax | 1.0 | Shell wax 400 |
| Petroleum wax | 0.5 | Shell wax 230 |
| Oleic acid | 3.0 | Emersol 210 |
| Antioxidant | 2.0 | phenylene diamine |
| Total Parts | 222.55 | |

| Banbury pass | | |
|---|---|---|
| Ingredients | Parts | |
| TSE pass material | 222.55 | |
| Accelerator | 0.15 | N-(cyclohexylthio) phthalimide |
| Zinc oxide | 2.5 | |
| Sulfur | 1.4 | |
| Diphenyl guanidine | 2.0 | N,N-diphenyl guanidine |
| Sulfenamide | 1.2 | N-cyclohexyl-2-benzothiazole sulfenamide |
| Silica | 3.0 | Zeosil Micropearl (Rhone Poulenc) |
| Total Parts | 232.8 | |

TABLE 3

| | Example 3-90A | Example 3-90B |
|---|---|---|
| Silica BET (m**2/g) | 150 | 165 |
| Rebound, RT (%) | 29.1 | 32.3 |
| Rebound, 100C (%) | 58.2 | 59.3 |
| DIN Abrasion | 141 | 126 |
| Tan Delta (11 Hz, 0C) | 0.192 | 0.205 |
| 300%/100% Modulus Ratio | 3.26 | 3.4 |

EXAMPLE 4

This example illustrates the enhanced properties obtained from a silica loaded tread compound which was continuously mixed, with added residence time. The additional residence time was obtained by mounting a single screw extruder at the outlet of the primary twin screw extruder. The additional residence time prolongs the period for which the compound is exposed to the temperature necessary for complete reaction between, for example, the silica coupler, the silica, and the rubbers.

The various non-productive ingredients described in Example 2 were fed at a total rate of 400 lb/h into the 90 mm twin screw extruder of Example 2 operated at 77 rpm. The compound was discharged from the twin screw extruder directly into a cross-head 4.5 inch diameter single screw extruder operated at 20 rpm. The compound was extruded at 315° F. through a slit die with a cross sectional area of about 2.8 square inches. The resultant compound was further mixed downstream with curatives in a conventional Banbury type internal mixer as described in Example 2. The comparison in Table 4 between Examples 4–90 and 2–90 shows the superior properties obtained with extended residence time.

TABLE 4

|  | Example 4-90 | Example 2-90 |
| --- | --- | --- |
| Silica BET (m**2/g) | 150 | 150 |
| Residence Time (s) | 180 | 55 |
| Rebound, RT (%) | 34.5 | 29.1 |
| Rebound, 100C (%) | 63.9 | 58.2 |
| DIN Abrasion | 161 | 141 |
| Tan Delta (11 Hz, 0C) | 0.233 | 0.192 |
| 300%/100% Modulus Ratio | 3.60 | 3.26 |

Reaction temperatures used ranged between 100° C. and 160° C. The lower temperature is necessary while extruding productive compounds (Example 1). The residence time in the extruder ranged from less than 1 minute to 3 minutes, with the shorter time corresponding to Examples 1, 2, and 3, and the longer time gained in Example 4 with the use of a crosshead extruder. It may be desirable to obtain even longer residence times depending on the operating temperature (shear rate).

Although specific embodiments of the invention have been illustrated and described, those skilled in the art will recognize that the invention may be variously modified and practiced without departing from the spirit of the invention. The invention is limited only by the following claims.

What is claimed is:

1. A method for the continuous mixing of elastomer compounds comprising the sequential steps of
   a) providing a twin screw extruder comprising a housing containing a pair of screws, the housing containing feed openings and a discharge opening,
   b) feeding an elastomer and 30 to 110 phr silica and at least one silica coupler into a feed opening,
   c) mixing said elastomer, silica and couplers at a temperature sufficient and for a time sufficient to permit a chemical reaction between said couplers and silica,
   d) adding curatives and accelerators that promote vulcanization in said elastomer,
   e) maintaining said mixture at a Mooney viscosity ASTM-D1646 (ML (1+4) 100C) between 20 to 250 units during mixing,
   f) continuing said mixing for a time sufficient to thoroughly mix said curatives into said elastomer, and
   g) extruding elastomer mixture from said twin screw extruder.

2. The method of claim 1 comprising the further steps of
   a) controlling the pressure and back pressure of said mixture at different levels defined by a screw profile along the length of said screws.

3. The method of claim 1 comprising the further step of determining desired feed rates based on the temperature of the extrudate which is determined by the viscosity of the elastomer compound, the size of the extruder, the screw profile, the torque limit and speed of operation of the extruder and the degradation temperature of the elastomer.

4. The method of claim 1 comprising the further step of extruding an elastomer mixed in said twin screw extruder through a die to provide a desired shape to an elastomer extrudate.

5. The method of claim 1 which comprises the further steps of
   a) extruding, cooling and grinding an extruded elastomer mixture, and
   b) feeding a ground elastomer mixture into a twin screw extruder,
   after step (c) and prior to step (d), and
   c) extruding the completed mixture through a die.

6. A method for the continuous mixing of elastomers comprising the steps of
   a) providing a twin screw extruder comprising a barrel housing containing a pair of screws, the housing containing feed openings and a discharge opening,
   b) building said screws to provide mixing zones in said housing,
   c) feeding an elastomer and 30 to 110 phr silica and silica couplers continuously in a controlled manner into said extruder through a feed opening,
   d) feeding at least one filler, additive, oil, or another elastomer in a controlled manner into the extruder through a feed opening or openings,
   e) mixing ingredients of steps (c) and (d) as they are added to provide a mixture,
   f) mixing said elastomer, silica and couplers at a temperature sufficient and for a time sufficient to permit a chemical reaction between said couplers and silica, adding curatives and accelerators that promote vulcanization in said elastomer and continuing said mixing for a time sufficient to thoroughly mix said curatives into said elastomer, while controlling the mixing of the mixture in each mixing zone such that the mixing varies depending on the ingredients being mixed,
   g) maintaining said mixture at a Mooney viscosity ASTM-D1646 (ML (1+4) 100C) of between 20 to 250 units during mixing, and
   h) extruding an elastomer mixed in said twin screw extruder through a die to provide a desired shape to an elastomer extrudate.

7. The method of claim 1 comprising the further step of increasing the residence time in twin screw extruder mixing by mixing a non-productive compound in one twin screw extruder and dumping the contents into a second twin screw extruder to mix a productive compound.

8. The method of claim 6 comprising the further step of increasing the residence time in twin screw extruder mixing by mixing a non-productive compound in one twin screw extruder and dumping the contents into a second twin screw extruder to mix a productive compound.

* * * * *